US012020841B2

(12) United States Patent
Patel

(10) Patent No.: US 12,020,841 B2
(45) Date of Patent: Jun. 25, 2024

(54) ELECTRONIC COMPONENT AND METHOD FOR MANUFACTURING AN ELECTRONIC COMPONENT

(71) Applicant: Würth Elektronik eiSos GmbH & Co. KG, Waldenburg (DE)

(72) Inventor: Arpankumar Patel, Schwäbisch Hall (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 494 days.

(21) Appl. No.: 16/938,022

(22) Filed: Jul. 24, 2020

(65) Prior Publication Data

US 2021/0027928 A1 Jan. 28, 2021

(30) Foreign Application Priority Data

Jul. 25, 2019 (EP) .................................... 19188238

(51) Int. Cl.
*H01F 27/22* (2006.01)
*H01F 27/02* (2006.01)
*H01F 27/28* (2006.01)

(52) U.S. Cl.
CPC ......... *H01F 27/022* (2013.01); *H01F 27/027* (2013.01); *H01F 27/2828* (2013.01)

(58) Field of Classification Search
CPC .. H01F 27/022; H01F 27/027; H01F 27/2828; H01F 2017/048; H01F 27/255; H05K 9/0032; H05K 9/0075; H05K 13/0084
See application file for complete search history.

(56) References Cited

U.S. PATENT DOCUMENTS

| | | | | |
|---|---|---|---|---|
| 6,462,638 | B2 * | 10/2002 | Imada | H01F 17/0013 336/200 |
| 2009/0085703 | A1 | 4/2009 | Liu et al. | |
| 2010/0271162 | A1 | 10/2010 | Yan et al. | |
| 2012/0119866 | A1 | 5/2012 | Kim et al. | |
| 2014/0009254 | A1 | 1/2014 | Ohkubo et al. | |

(Continued)

FOREIGN PATENT DOCUMENTS

| | | | |
|---|---|---|---|
| CN | 101971721 | A | 2/2011 |
| CN | 202172556 | U | 3/2012 |

(Continued)

OTHER PUBLICATIONS

Chinese 1st Office Action with English Translation, dated Jan. 20, 2023, 8 pages.

*Primary Examiner* — Tuyen T Nguyen
(74) *Attorney, Agent, or Firm* — Boyle Fredrickson S.C.

(57) ABSTRACT

The electronic component comprises at least a first electronic element arranged inside a first casing of magnetic material and at least a second electronic element arranged inside a second casing of magnetic material. At least a first outer surface of the first casing and at least a second outer surface of the second casing are connected to each other with a non-magnetic layer and with at least one connection support. The connection support is adapted to be tension-resistant and is adapted and arranged such that the connection support substantially completely prevents an increase in a distance between the first outer surface and the second outer surface upon heating the non-magnetic layer.

17 Claims, 5 Drawing Sheets

(56) References Cited

U.S. PATENT DOCUMENTS

| | | | | |
|---|---|---|---|---|
| 2015/0287515 | A1 | 10/2015 | Choi | |
| 2016/0217903 | A1* | 7/2016 | Jeong | H01F 17/04 |
| 2016/0217917 | A1 | 7/2016 | Jeong | |
| 2017/0196091 | A1* | 7/2017 | Lee | H01F 27/292 |

FOREIGN PATENT DOCUMENTS

| | | | | |
|---|---|---|---|---|
| CN | 104766691 | A | 7/2015 | |
| CN | 104766693 | A | 7/2015 | |
| CN | 104980007 | A | 10/2015 | |
| CN | 207166856 | U | 3/2018 | |
| CN | 207690243 | U | 8/2018 | |
| EP | 3291254 | | 3/2018 | |
| EP | 3291254 | A1 * | 3/2018 | H01F 17/0013 |
| JP | 2002373814 | A | 12/2002 | |
| JP | 2004152947 | A * | 5/2004 | |
| JP | 3801955 | B2 * | 7/2006 | |
| WO | 2004052072 | A1 | 6/2004 | |
| WO | 2010016367 | | 2/2010 | |
| WO | 2016162153 | A1 | 10/2016 | |
| WO | 2017061773 | A1 | 4/2017 | |

* cited by examiner

ELECTRONIC COMPONENT AND METHOD FOR MANUFACTURING AN ELECTRONIC COMPONENT

FIELD OF THE INVENTION

The invention relates to an electronic component comprising at least a first electronic element arranged inside a first casing of magnetic material and at least a second electronic element arranged inside a second casing of magnetic material. The invention further relates to a method for manufacturing an electronic component.

In Mainboards, in Wi-Fi communication devices or in DC/DC converters for high currents, e.g. in power supplies for mobile devices, use is frequently made of electronic elements, e.g. a storage choke or an inductance. In order to obtain a compact design with high power density and high current capability the electronic element is embodied as a molded electronic element having a casing of magnetic material. The magnetic material reduces the expansion of the magnetic field of the electronic element such that the magnetic field does not easily expand into the surroundings. Commonly, the applications named above require more than one single molded electronic component and, in some cases, several molded electronic components are mounted on a base substrate. The base substrate is afterwards soldered e.g. inside a power supply.

WO 2010/016367 A1 discloses a composite electronic component, wherein an upper surface of the composite electronic component comprises connecting terminals for a control IC chip, an input capacitor and an output capacitator.

BACKGROUND

It is an object of the invention to provide an electronic component having a compact design with high power density and high current capability and being suitable for automatic soldering. Further, it is object of the invention to provide a method for manufacturing the electronic component.

The invention solves this problem by providing an electronic component according to claim 1 and a method according to claim 13.

The electronic component comprises at least a first electronic element arranged inside a first casing of magnetic material and at least a second electronic element arranged inside a second casing of magnetic material. At least a first outer surface of the first casing and at least a second outer surface of the second casing are connected to each other with a non-magnetic layer and with at least one connection support. The connection support is adapted to be tension-resistant and is adapted and arranged such that the connection support substantially completely prevents an increase in a distance between the first outer surface and the second outer surface upon heating the non-magnetic layer.

The first electronic element might be a passive electronic component, in particular an inductor, a high current inductor, a dual inductor, a common mode choke, a throttle, a coil, a flyback transformer, a power transformer, a signal transformer, a capacitor, a resistor, a magnetic device or a memristor.

The second electronic element might be a passive electronic component, in particular an inductor, a high current inductor, a dual inductor, a common mode choke, a throttle, a coil, a flyback transformer, a power transformer, a signal transformer, a capacitor, a resistor, a magnetic device or a memristor.

The magnetic material for the first casing and for the second casing might be a ferrite material or ferromagnetic material. In particular the magnetic material comprises at least partially iron, nickel, zinc or magnesium. In particular the magnetic material comprises a composition of nickel and zinc or magnesium and zinc.

The first casing or the second casing might be described as housings for the first electronic element or for the second electronic element. The first electronic element or the second electronic element might be completely arranged or embedded or enclosed inside the first casing or the second casing, respectively.

The first outer surface might be a front surface of the first casing.

The second outer surface might be a front surface of the second casing. The second outer surface and the first outer surface might face each other. The second outer surface and the first outer surface might be parallel and offset to each other.

The non-magnetic layer might be a plastic or polymer layer. In particular the non-magnetic layer might comprise or be a glue or binder. The non-magnetic layer might hold or attach or mechanically connect the first casing to the second casing, in particular by a material bond. The non-magnetic layer might comprise similar magnetic properties as an air cap. The non-magnetic layer might be a magnetic insulation arranged between the first casing and the second casing. In particular the non-magnetic layer might magnetically isolate the first electronic element and the second electronic element inside from each other, such that a magnetic flux from the first electronic element or the second electronic element does not affect the second electronic element or the first electronic element. As an advantage, the non-magnetic layer ensures that no interference occurs between the first electronic element and the second electronic element.

The connection support might be mechanically connected to the first outer surface and the second outer surface. The connection support might comprise a first end, wherein the first end is embedded in the first casing and wherein the connection support penetrates the first outer surface. Further, the connection support might comprise a second end, wherein the second end is embedded in the second casing and wherein the connection support penetrates the second outer surface. The connection support might penetrate or pierce the non-magnetic layer. The connection support might comprise a layer section surrounded by the non-magnetic layer. The connection support might be a rod, in particular a round rod or a squared rod.

Tension-resistant might imply that the connection support is adapted to sustain tension and/or adapted to sustain tensile forces, in particular tensile forces between the first outer surface and the second outer surface. The connection support might sustain tension and/or tensile forces without deformation or with nearly no deformation, in particular a length of the connection support in a direction of a tensile force might increase by 5%, in particular 3%, in particular 2%, in particular 1%. The tensile forces or tension might occur during lifetime of the electronic component.

Heating the non-magnetic layer might be local heating or complete heating of the non-magnetic layer.

The electronic component might be adapted to be connected to a printed circuit board. The connection between the electronic component and the printed circuit board might be produced by soldering, in particular by automatic soldering, e.g. by reflow soldering. When the electronic component is soldered on the printed circuit board, the temperature of the non-magnetic layer might increase, in particular when the electronic component together with the printed circuit board are placed inside an oven in which the electronic component together with the printed circuit board are heated for soldering. Without considering the connection support, the thermal expansion of the non-magnetic layer would result to an increase in distance between the first outer surface and the second outer surface. However, the connection support might comprise a lower thermal expansion coefficient as the non-magnetic layer. Thus, the connection support might not expand in the same manner as the non-magnetic layer due to heating and the increase in distance between the first outer surface and the second outer surface is completely zero or lower compared to an electronic component without connection supports. Consequently, the connection support prevents a significant increase in a distance between the first outer surface and the second outer surface upon heating the non-magnetic layer. A significant increase is considered as an increase of more than 5%, in particular more than 3%, in particular more than 2%, in particular more than 1%.

Accordingly, the electronic component is suitable for automatic soldering and has a compact design with high power density and high current capability.

In an embodiment, the connection support is adapted to be compression-resistant and is adapted and arranged such that at least the connection support substantially completely prevents a reduction in the distance between the first outer surface and the second outer surface upon cooling the non-magnetic layer. Cooling the non-magnetic layer might be local or complete cooling of the non-magnetic layer. Compression-resistant might imply that the connection support is adapted to sustain pressure and/or adapted to sustain pressure forces, in particular pressure forces between the first outer surface and the second outer surface. The connection support might sustain pressure and/or pressure forces without deformation or with nearly no deformation, in particular a length of the connection support in a direction of a pressure force might decrease by 3%, in particular 1%. The pressure forces or pressure might occur during lifetime of the electronic component. In particular cooling might occur during production of a connection between the electronic component and a printed circuit board.

In an embodiment, the connection support is adapted to be torsion-resistant and/or the first outer surface and the second outer surface are connected together with at least two connection supports having a distance from each other. Torsion-resistant might imply that the connection support is adapted to sustain a torque, in particular between the first outer surface and the second outer surface. The connection support might sustain a torque without deformation or with nearly no deformation, in particular the connection support might be twisted through the torque by 3°, in particular 1°. The torque might occur during lifetime of the electronic component, in particular during production of a connection between the electronic component and a printed circuit board. A cross section of the connection support might be rectangular, triangular, round or doughnut-shaped. The first outer surface and the second outer surface might be connected together with two, three, four, five or six connection supports having a distance from each other, in particular an equal distance from each other. An equivalent long connection support might be used. In particular a length of the connection support might be equal to the distance between the connection supports. Instead of two or more connection supports in a distance to each other only one wide connection support can be used.

In an embodiment, the connection support is formed as a material strip of sheet metal or plastic, wherein the material strip has a length which is greater than its width and wherein the material strip is embedded with a first longitudinal end of the material strip in the first casing and is embedded with a second longitudinal end of the material strip in the second casing. A direction parallel to the length of the connection support might be perpendicular to the first outer surface and/or perpendicular to the second outer surface. The sheet metal might comprise copper or might be made of copper. The material strip might be originally part of a lead frame.

In an embodiment, the connection support is electrically conductive and the connection support electrically connects the first electronic element to the second electronic element. In an embodiment, the first casing and/or the second casing are prism-shaped or cylindrical, in particular with a triangular, square or circular cross-section.

In an embodiment, the first casing and/or the second casing comprise at least an electrical contact on at least one outer surface. The electrical contact might be arranged on an underside of the first casing and/or at an underside of the second casing. Further, the electrical contact might be arranged at least at a side being perpendicular to the underside of the first casing and/or at least at a side being perpendicular to the underside of the second casing.

In an embodiment, the first casing and the second casing are arranged side by side. The non-magnetic layer might cover all outside surfaces of the first casing and/or the second casing except an underside of the first casing and/or an underside of the second casing or except the electrical contact of the first casing and/or the electrical contact of the second casing. The first casing and/or the second casing might be moulded or overmoulded with the non-magnetic layer except the underside of the first casing and/or the underside of the second casing or except the electrical contact of the first casing and/or the electrical contact of the second casing.

In an embodiment, the first casing and the second casing are arranged one above the other. Advantageously, the electronic component comprises a compact design.

In an embodiment, the electronic component comprises at least a third electronic element arranged inside a third casing of magnetic material, wherein the first casing and the second casing are arranged side by side and the third casing is arranged above the first casing and/or above the second casing. The electronic component might be a three-dimensional array.

In an embodiment, the non-magnetic layer has a thickness of at least 0.1 mm. In particular the thickness might be in the range of 0.1-0.4 mm, in particular 0.1-0.2 mm, in particular the thickness is 0.1 mm.

In an embodiment, the non-magnetic layer comprises an epoxy.

The problem underlying the invention is also solved by a method for manufacturing an electronic component comprises the step: embedding section by section of the connection support into the first casing, the second casing and/or the third casing. The connection support might be pushed or moved into the first casing, the second casing and/or the third casing.

In an embodiment, the embedding takes place during the production of the first casing, the second casing and/or the third casing. The production of the first casing, the second casing and/or third casing might be done by hot molding, cold molding, injection molding or sintering. In particular the material of the first casing, the second casing and/or the third casing might be magnetic powder or magnetic powder mixed with a binder or glue. In particular the magnetic powder might comprise or be iron powder or ferrite powder. The production is carried out by pressing the powder and the binder or glue together under heating. The production of the first casing, the second casing and/or third casing might be done in one-time, two-time or three-time molding process. In particular the embedding of the at least one connection support might take place before the magnetic powder of the first casing, the second casing and/or the third casing is pressed.

In an embodiment, the at least one connection support is part of a lead frame for providing electrical contacts of the electronic component and wherein the method comprises the step: at least partially embedding of the lead frame in the first casing, the second casing and/or the third casing. In particular the lead frame might be embedded before the magnetic powder of the first casing, the second casing and/or the third casing is pressed.

In an embodiment, the method comprises the step: separation of the connection support and/or the electrical contacts from the lead frame. In particular the separation takes place after the magnetic powder of the first casing, the second casing and/or the third casing has been pressed.

Further characteristics and advantages of the invention result from the claims and the following description of preferred implementations of the invention in connection with the drawings. Individual features of the presented and described implementations of the invention can be combined in any way without exceeding the scope of the invention.

DETAILED DESCRIPTION

Figure 1:
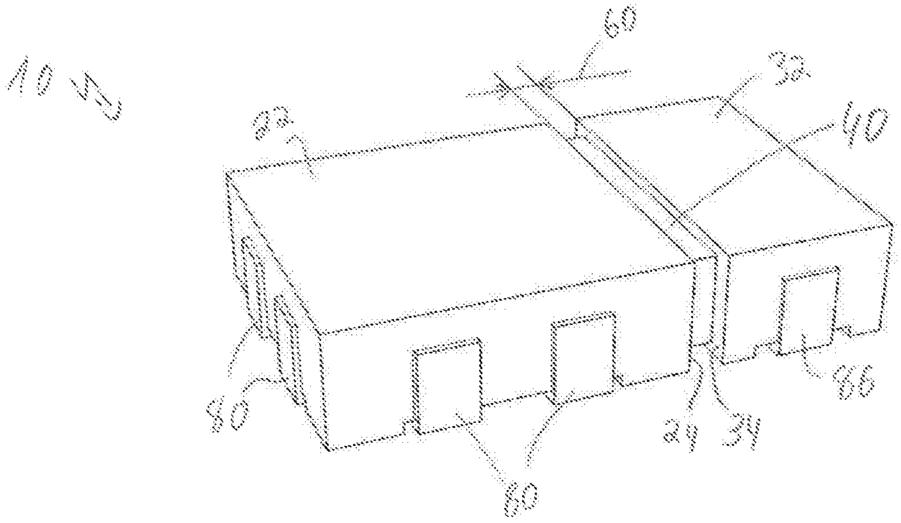
FIG. 1 an oblique view from top of an inventive electronic component.

FIG. 1 shows an electronic component 10 according to the invention from top. The electronic component 10 comprises a first casing 22 and second casing 32. Each casing 22, 32 consists of magnetic material or comprises magnetic material, in particular each casing 22, 32 is a molded casing of iron powder or ferrite powder. The iron powder or ferrite powder may be mixed with binder, e.g. resin and hardener, or may be sintered. The first casing 22 is arranged side-by-side to the second casing 32, wherein the first casing 22 comprises a first outer surface 24 and the second casing 32 comprises a second outer surface 34. Both outer surfaces 24, 34 face each other and are arranged parallel to each other. A distance 60 between both outer surfaces 24, 44 amounts to 0.1 and is advantageously in a range between 0.1 mm and 0.4 mm. The first casing 22 and a second casing 32 are of cuboid shape.

The first casing 22 and the second casing 32 are mechanically connected together at their outer surfaces 24, 34 by means of a non-magnetic layer 40 in form of a glue and also by means of two connection supports 50, 52, which are not visible in FIG. 1 and which will be explained in conjunction with FIG. 3. In particular, both casings 22, 32 are glued together with an epoxy acting as the non-magnetic layer 40. Thus, a thickness of the non-magnetic layer 40 and the distance 60 are equal. In other words, the non-magnetic layer 40 has thickness of 0.1 mm. The non-magnetic layer 40 is magnetically insulating, such that a magnetic flux from the first casing 22 or from the second casing 42 cannot pass the non-magnetic layer 44 or at least the magnetic flux is significantly reduced when the magnetic flux passes the non-magnetic layer 44.

The first casing 22 and the second casing 32 comprise electrical contacts 80, 86. The electrical contacts 80, 86 are adapted to be connected to a printed circuit board not shown in FIG. 1, in particular by soldering electrical contacts 80, 86 of the electronic component 10 to the corresponding contact pads of a printed circuit board.

Figure 2:
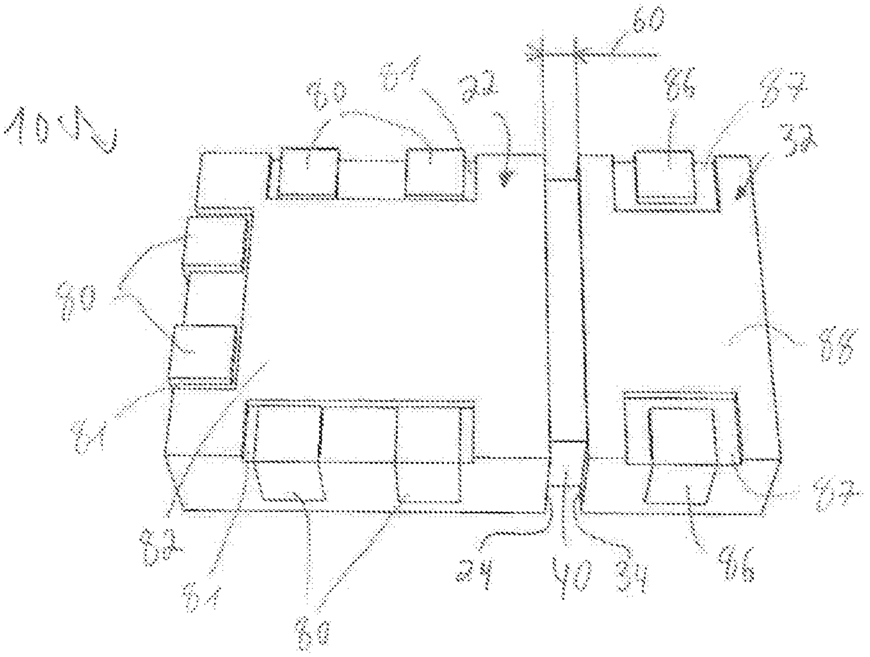
FIG. 2 an oblique view from bottom of the electronic component of FIG. 1, FIG. 3 the view from FIG. 2 without a first casing and a second casing, FIG. 4 an oblique view from bottom of another embodiment of an inventive electronic component without a first casing, a second casing and electrical contacts, FIG. 5 an oblique view from top of another embodiment of an inventive electronic component comprising a third casing arranged side by side to a first casing and to a second casing, FIG. 6 an oblique view from top of another embodiment of an inventive electronic component comprising a third casing arranged above a first casing and to a second casing, FIG. 7 an oblique view from top of the electronic component of FIG. 6 without the third casing, FIG. 8 an oblique view from bottom of the electronic component of FIG. 6 without the first casing, the second casing and the third casing, and FIG. 9 the oblique view from FIG. 2 from another perspective.

FIG. 2 shows the electronic component 10 of FIG. 1 from below. The first casing 22 comprises first recesses 81 and the second casing 42 comprises second recesses 87. The first recesses 81 and the second recesses 87 are arranged at an underside of the first casing 22 and the second casing 32, respectively. The recesses 81, 87 are adapted to receive at least a section of the electrical contacts 80, 86. Each of the first recesses 81 is adapted to receive the section of two electrical contacts 80, said section being parallel to the underside of the first casing 22, and each of the second recesses 87 is adapted to receive the section of one single electrical contact 86, said section being parallel to the underside of the second casing 32. In an embodiment not shown a recess might be adapted to receive the sections of more than two electrical contacts, in particular three, four or five electrical contacts. A depth of the recesses 81, 87 is chosen so that the sections of the electrical contacts 80, 86 do not protrude from the underside of the first casing 22 and the second casing 32, respectively. Further, the electrical contacts 80, 86 comprise a section which is arranged parallel to outer surfaces of the first casing 22 and the second casing 32.

Figure 3:
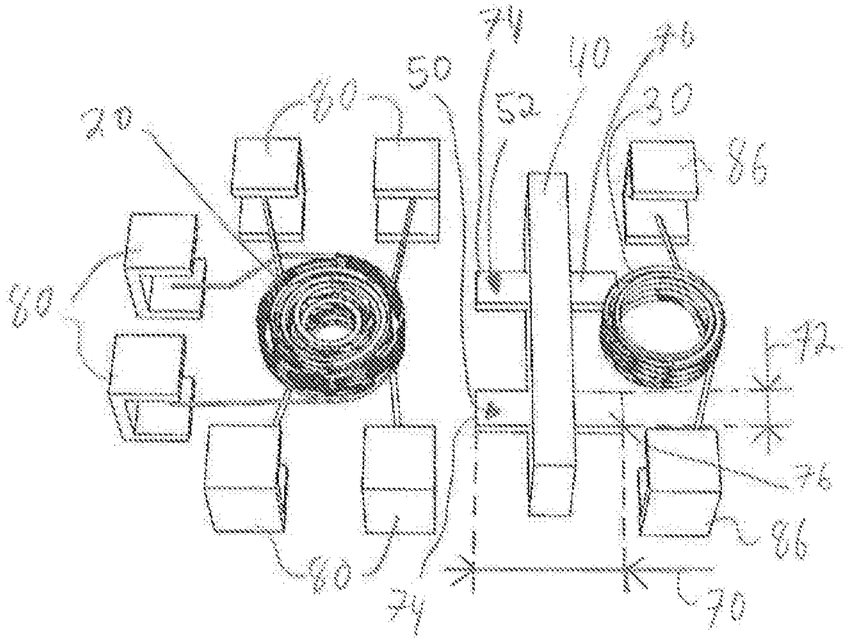

FIG. 3 shows the electronic component 10 of FIG. 2 without the first casing 22 and the second casing 32. A first electronic element 20 is arranged inside the first casing 22 and a second electronic element 30 is arranged inside the second casing 32. The first electronic element 20 is embodied as three concentric coils, wherein each coil is electrically connected to two electrical contacts 80. The second electronic element 30 is embodied as a single coil, wherein the coil is electrically connected to two electrical contacts 86. The electrical contacts 80 comprise a section partly arranged inside the first casing 22 so that electrical connections between the electrical contacts 80 and the coils of element 20 are arranged inside the first casing 22. The electrical contacts 86 are partly arranged inside the second casing 32 such that the electrical connection between the electrical contacts 86 and the electronic element 30 is arranged inside the casing 32. There is no electrical connection between the first electronic element 20 and the second electronic element 30.

The non-magnetic layer 40 magnetically isolates the coils of the first electronic element 20 and the coil of the second electronic element 30 from each other, such that the first electronic element 20 does not interfere with the second electronic element 30 and vice versa.

The electronic component 10 comprises two connection supports 50, 52 positioned at a distance from each other and penetrating the non-magnetic layer 40. Each connection support 50, 52 is formed as a material strip of sheet metal, e.g. made of cooper, having a length 70 and the width 72. The length 70 is greater than the width 72. A first longitudinal end 74 of each connection support 50, 52 is embedded inside the first casing 22 for mechanically connecting the first outer surface 24 and a second longitudinal end 76 of each connection support 50, 52 is embedded inside the second casing 32 for mechanically connecting the second outer surface 34. Thus, the first outer surface 24 and the second outer surface 34 are mechanically connected to each other by means of the connection supports 50, 52 and in addition by means of the non-magnetic layer 40. Each connection support 50, 52 comprises a middle section arranged between the first longitudinal end 74 and the second longitudinal end 76, wherein the middle section is surrounded by the non-magnetic layer 40. Accordingly, each connection support 50, 52 pierces the non-magnetic layer 40.

Each of the connection supports 50, 52 is tension-resistant. It might be the case that tensile forces between the first casing 22 and the second casing 32 occur, in particular between the first outer surface 24 and the second outer surface 34. The origin of the tensile forces might be an increase in temperature, which is observed when the electronic component 10 is soldered to a printed circuit board. In detail, during soldering a temperature of the non-magnetic layer 40 increases, which then expands upon heating. Since the non-magnetic layer 40 comprises a higher thermal expansion coefficient compared to the connection supports 50, 52, the thermal expansion of the non-magnetic layer 40 is higher than the thermal expansion of the connection supports 50, 52. The difference in thermal expansion of the non-magnetic layer 40 and the connection supports 50, 52 leads to tensile forces applied on the connection supports 50, 52. Since the connection supports 50, 52 are tension-resistant, the connection supports 50, 52 sustain the tensile forces without any deformation or with a neglectable extension in a direction of the tensile force of less than 5%, in particular 3%, in particular 2%, in particular 1%. Accordingly, the distance 60 between the first casing 22 and the second casing 32 does not increase or increases only in a neglectable manner and thus the electrical contacts 80, 86 stay in their position allowing reduced manufacturing tolerances and a compact design of the electronic component 10. Especially, soldering to a printed circuit board is possible, since the electrical contacts 80, 86 of the electronic component 10 do not change their relative position when the electrical component 10 is heated up during soldering.

Each of the connection supports 50, 52 is also compression-resistant. It might be the case that pressure forces between the first casing 22 and the second casing 32 occur, in particular between the first outer surface 24 and the second outer surface 34. The origin of the pressure forces might be a decrease in temperature, which is observed during production of the electrical connection between the electronic component 10 and a printed circuit board. The non-magnetic layer 40 contracts, when a temperature of the non-magnetic layer 40 decreases. Since the non-magnetic layer 40 comprises a higher thermal expansion coefficient compared to the connection supports 50, 52, the thermal contraction of the non-magnetic layer 40 is higher than the thermal contraction of the connection supports 50, 52. The difference in thermal contraction of the non-magnetic layer 40 and the connection supports 50, 52 leads to pressure forces applied on the connection supports 50, 52. Since the connection supports 50, 52 are compression-resistant, the connection supports 50, 52 sustain the pressure forces without any deformation or with a neglectable contraction in a direction of the pressure force of 3%, in particular 1%. Accordingly, the distance 60 between the first casing 22 and the second casing 32 does not decrease or decreases only in a neglectable manner and thus the electrical contacts 80, 86 stay in their position allowing reduced manufacturing tolerances and a compact design of the electronic component 10. Especially, there is no risk that a soldering connection between the contacts 80, 86 of the electrical component 10 and a printed circuit board breaks up when cooling down the electrical component 10 after soldering.

Figure 4:
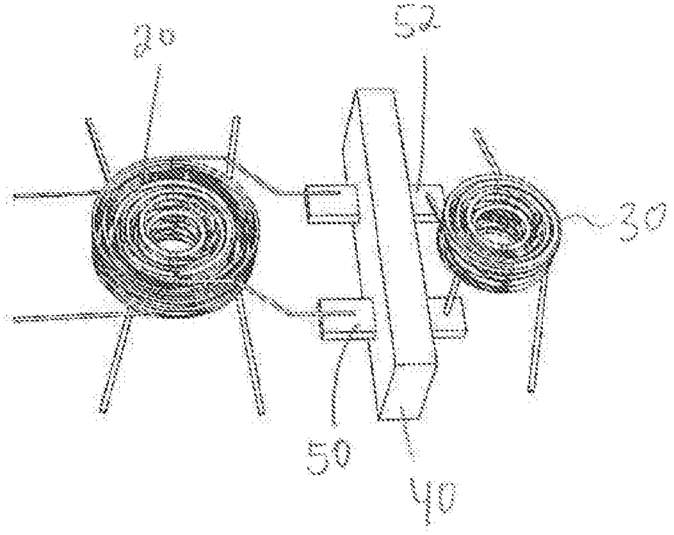
Figure 5:
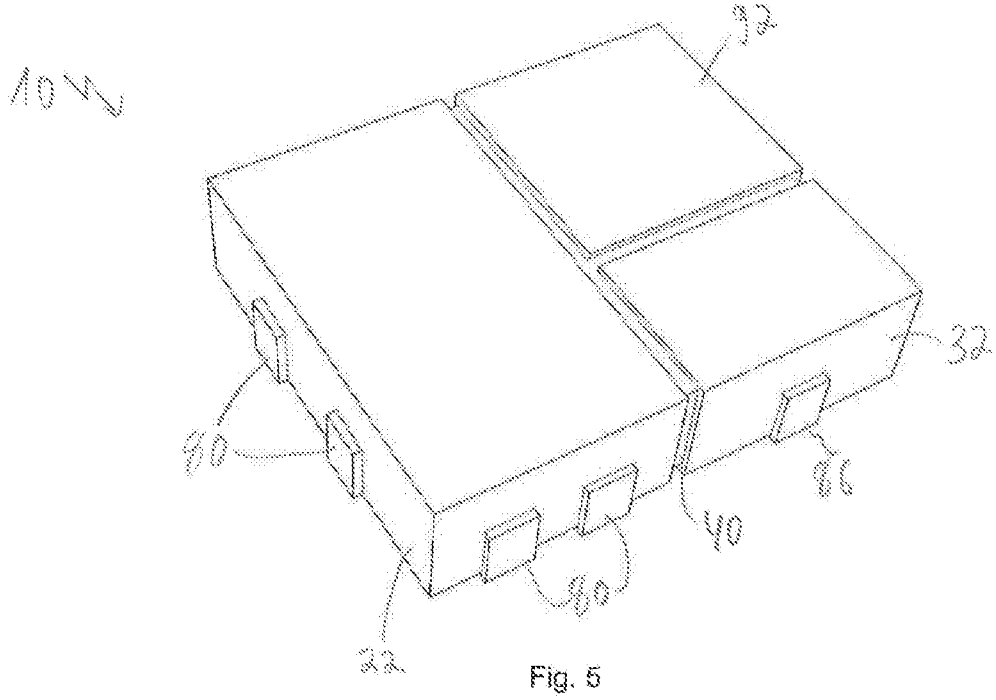

FIG. 4 shows a second embodiment of the electronic component 10 without a first casing, without a second casing and without electrical contacts. For a better understanding of identical and functionally equivalent elements, the same reference signs are used and in this respect reference is made to the above description of the embodiment shown in FIGS. 1 to 3, so that only the existing differences are discussed. The electronic component 10 of FIG. 4 comprises two electrically conductive connection supports 50, 52. The connection supports 50, 52 are electrically connected to a first electronic element 20 and to a second electronic element 30. In detail, the first electronic element 20 comprises four coils and the second electronic element 30 comprises two coils. One end of a coil of the first electronic element 20 is electrically connected to the first connection support 50. The other end of the same coil or one end of another coil of the first electronic element 20 is electrically connected to the second connection support 52. Additionally, one end of a coil of the second electronic element 30 is electrically connected to the first connection support 50 and another end of the same coil or one end of another coil of the electronic element 30 is electrically connected to the second connection support 52. Thus, two coils of the first electronic element 20 are electrically connected to one coil of the second electronic element 30. In any case at least one of the connection supports 50, 52 can be used for an electrical connection between the first electronic element 20 and the second electronic element 30. FIG. 5 shows a further embodiment of the electronic component 10. The electrical component 10 comprises a first casing 22, a second casing 32 and a third casing 92, wherein a first electronic element is arranged inside the first casing 22, a second electronic element is arranged inside the second casing 32 and a third electronic element is arranged inside the third casing 92. All casings 22, 32, 92 are arranged side-by-side so that the undersides of all casings 22, 32, 92 are aligned to each other or are flush with each other and all casings 22, 32, 92 are connected with a non-magnetic layer 40 to each other. A longitudinal length of the first casing 22 is equal to a length of second casing 32 and third casing 92 being connected with the non-magnetic layer 14. The electronic component 10 is of cuboid shape. The non-magnetic layer 14 is t-shaped.

The electronic components 10 according to the embodiment of FIG. 5, according to the embodiment of FIGS. 1 to 3 and according to the embodiment of FIG. 4 are manufactured by a one-time molding process. The casings 22, 32, 92 consist of a mixture of magnetic powder in form of iron powder and glue, wherein the mixture is pressed together and at the same time heated. Before pressing the mixture, the connection supports 50, 52 are embedded inside the mixture of the casings 22, 32, 92.

Figure 6:
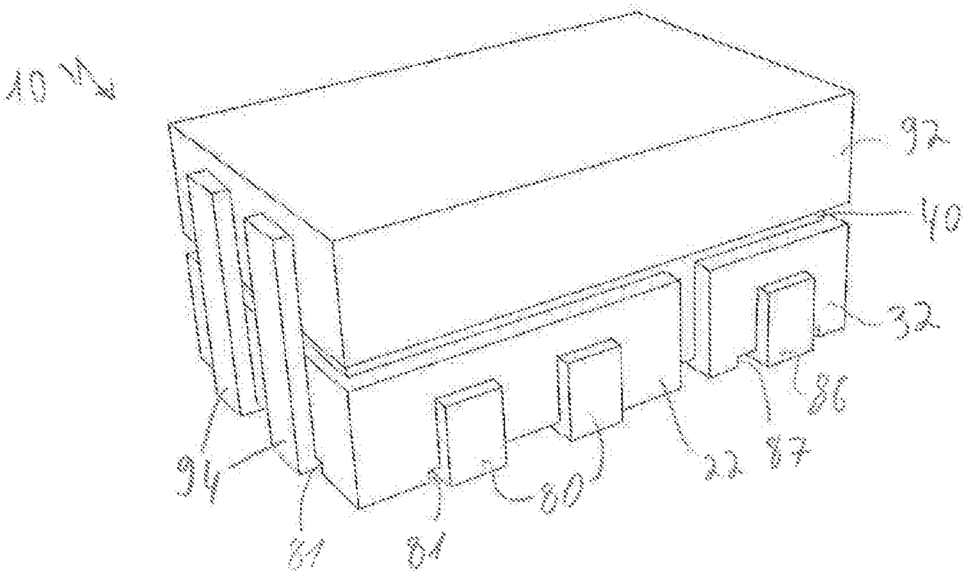

FIG. 6 shows a further embodiment of the electronic component 10. The embodiment of FIG. 6 differs from the embodiment in FIGS. 1 to 3 in that a third casing 92 is arranged above a first casing 22 and above a second casing 32.

The third casing 92 comprises electrical contacts 94. The electrical contacts 94 are adapted to be connected to a printed circuit board not shown in FIG. 6, in particular by soldering the electronic component 10 to the printed circuit board. A section of the electrical contacts 94 is arranged in a first recess 81 of the underside of first casing 22. A further section of the electrical contacts 94 is arranged at an outer surface of the first casing 22 and the third casing 92.

Figure 7:
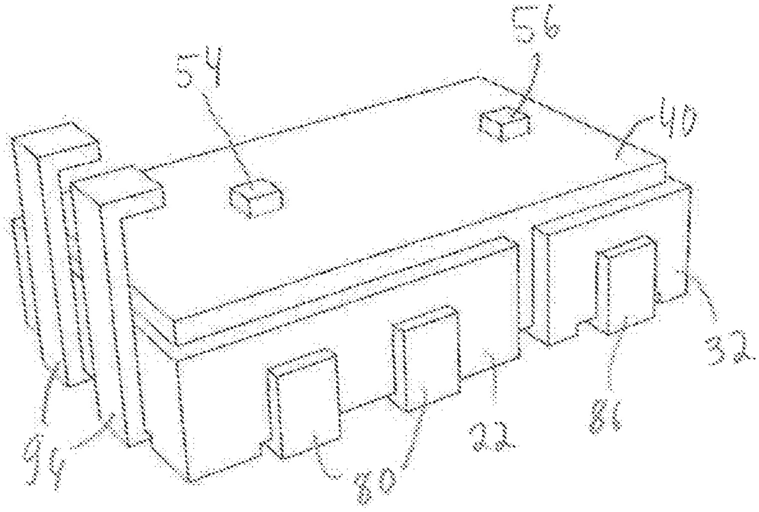

FIG. 7 shows the electronic component 10 of FIG. 6 without the third casing and without the electronic element arranged inside the third casing. The electronic component 10 comprises a first connection support 54 arranged between the third casing 92 and the first casing 22 and a second connection support 56 arranged between the third casing 92 and second casing 32. Each of the connection supports 54, 56 is embodied as squared rod being tension-resistant and torsion-resistant.

Figure 8:
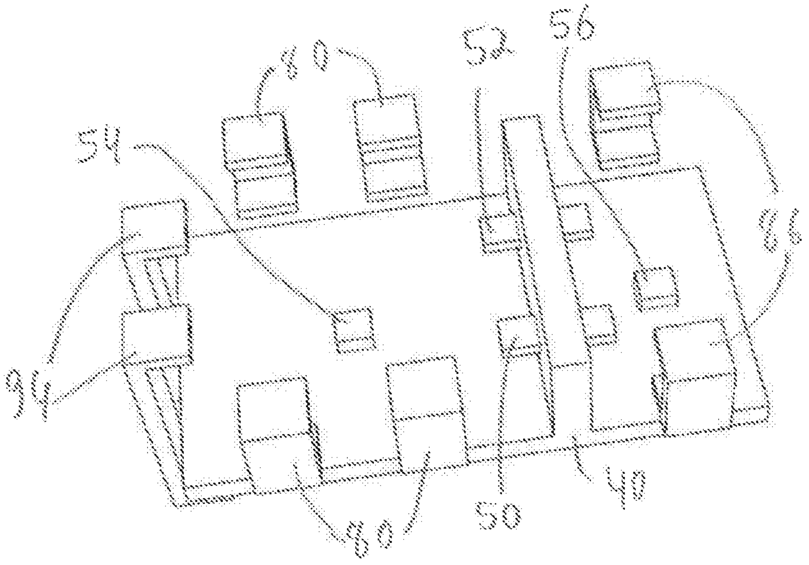

FIG. 8 shows the electronic component 10 of FIG. 7 from below without the first casing 22, without the second casing 32 and without the third casing 92. The connection supports 54, 56 pierce or penetrate the non-magnetic layer 40.

Figure 9:
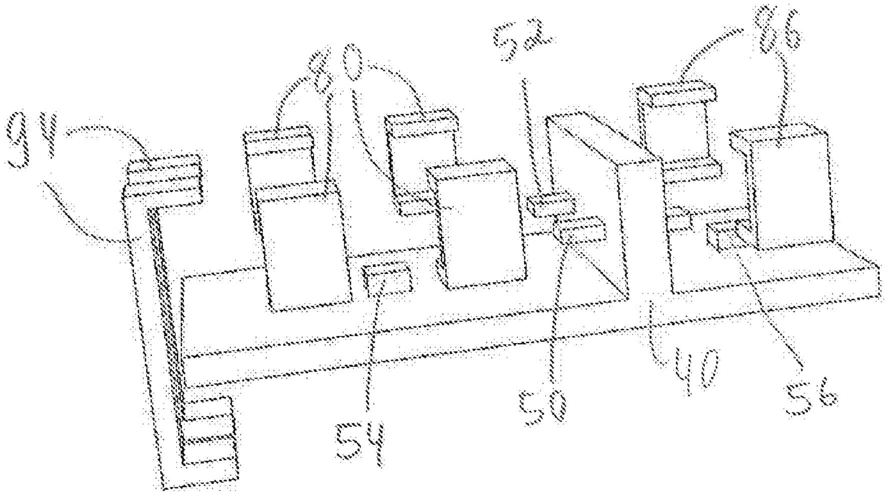

FIG. 9 shows the electronic component 10 of FIG. 8 from another perspective.

The electronic component 10 shown in FIGS. 6 to 9 is manufactured by two-time molding process or two step molding process. In a first step the electronic elements 20, 30 are electrically connected to a lead frame providing the electrical contacts 80, 86 and connection supports 50, 52. In a second step the electronic elements 20, 30 and the connection supports 50, 52, 54, 56 are embedded with the material of the casings 22, 32. The material of the casings 22, 32 is a mixture of magnetic powder in form of iron powder and binder, especially glue. At this state the material of the casings 22, 32 is flexible and easy to form. As a third step the casings 22, 32 are molded, e.g. by pressing, heating and/or curing the material of casings 22, 32. As a fourth step the connection supports 50, 52 and the electrical contacts 80, 86 are separated from the lead frame and the electrical contacts 80, 86 are bent, such that sections of the electrical contacts 80, 86 are arranged inside their corresponding recesses 81, 87. As a fifth step the electronic element which will be arranged inside the third casing 92, is electrically connected to a further lead frame. In a sixth step the electronic element is embedded with the material of the third casing 92. As a seventh step the casing 92 is molded. As an eight step the electrical contacts 94 are separated from the lead frame and are bent, such that the electrical contacts 94 are arranged inside their corresponding recess 81. As a ninth step the non-magnetic layer 40 is manufactured by filling the space between the casings 22, 32, 92 with glue.

The invention makes it possible to fabricate the electronic component according to a modular principle allowing a high flexibility. For example, the electronic component can be individually manufactured depending on the application, wherein multiple different electronic elements can be integrated in the electronic component. As an advantage, instead of soldering each electronic element separately on a printed circuit board, the electronic component is soldered on the printed circuit board in a single soldering process, wherein all electronic elements of the electronic component are soldered in a single soldering step. Accordingly, the inventive electronic component is suitable for automatic soldering. Thus, the embodiments shown in the figures and explained above make clear, that the invention provides an electronic component having a compact design with higher power density and high current capability and being suitable for automatic soldering and the invention further provides a method for manufacturing the electronic component.

The invention claimed is:

1. Electronic component comprising at least a first electronic element arranged inside a first casing of magnetic material, at least a second electronic element arranged inside a second casing of magnetic material, the second casing being separate from, and external to, the first casing, wherein at least a first outer surface of the first casing and at least a second outer surface of the second casing are connected to each other with a non-magnetic layer and with at least one connection support, wherein the connection support is adapted to be tension-resistant and is adapted and arranged such that the connection support substantially completely prevents an increase in a distance between the first outer surface and the second outer surface upon heating the non-magnetic layer.

2. Electronic component according to claim 1, wherein the connection support is adapted to be compression-resistant and is adapted and arranged such that at least the connection support substantially completely prevents a reduction in the distance between the first outer surface and the second outer surface upon cooling the non-magnetic layer.

3. Electronic component according to claim 1, wherein the connection support is adapted to be torsion-resistant and/or the first outer surface and the second outer surface are connected together with at least two connection supports having a distance from each other.

4. Electronic component according to claim 1, wherein the connection support is formed as a material strip of sheet metal or plastic, wherein the material strip has a length which is greater than its width and wherein the material strip is embedded with a first longitudinal end of the material strip in the first casing and is embedded with a second longitudinal end of the material strip in the second casing.

5. Electronic component according to claim 1, wherein the connection support is electrically conductive and the connection support electrically connects the first electronic element to the second electronic element.

6. Electronic component according to claim 1, wherein the first casing and/or the second casing are prism-shaped or cylindrical, in particular with a triangular, square or circular cross-section.

7. Electronic component according to claim 1, wherein the first casing and/or the second casing comprise at least an electrical contact on at least one outer surface.

8. Electronic component according to claim 1, wherein the first casing and the second casing are arranged side by side.

9. Electronic component according to claim 1, wherein the first casing and the second casing are arranged one above the other.

10. Electronic component according to claim 1, comprising at least a third electronic element arranged inside a third casing of magnetic material, wherein the first casing and the second casing are arranged side by side and the third casing is arranged above the first casing and/or above the second casing.

11. Electronic component according to claim 1, wherein the non-magnetic layer has a thickness of at least 0.1 mm.

12. Electronic component according to claim 1, wherein the non-magnetic layer comprises an epoxy.

13. Method for manufacturing an electronic component according to claim 1, comprising the step:

embedding section by section of the connection support into the first casing, the second casing and/or the third casing.

14. Method according to claim 13, wherein the embedding takes place during the production of the first casing, the second casing and/or the third casing.

15. Method according to claim 13, wherein the at least one connection support is part of a lead frame for providing electrical contacts of the electronic component and wherein the method comprises the step:

at least partially embedding of the lead frame in the first casing, the second casing and/or the third casing.

16. Method according to claim 15, comprising the step:

separation of the connection support and/or the electrical contacts from the lead frame.

17. An electronic component, comprising at least a first electronic element arranged inside a first casing of magnetic material, at least a second electronic element arranged inside a second casing of magnetic material, the second casing being separate from, and external to, the first casing, wherein at least a first outer surface of the first casing and at least a second outer surface of the second casing are connected to each other with a non-magnetic layer and with at least one connection support, wherein the connection support is adapted to be tension-resistant and is adapted and arranged such that the connection support substantially completely prevents an increase in a distance between the first outer surface and the second outer surface upon heating the non-magnetic layer, further wherein the connection support penetrates or pierces the non-magnetic layer.

* * * * *